Feb. 20, 1940.    L. LEITZ ET AL    2,191,281
COMBINED PHOTOGRAPHIC CAMERA AND VIEW FINDER
Filed June 10, 1938
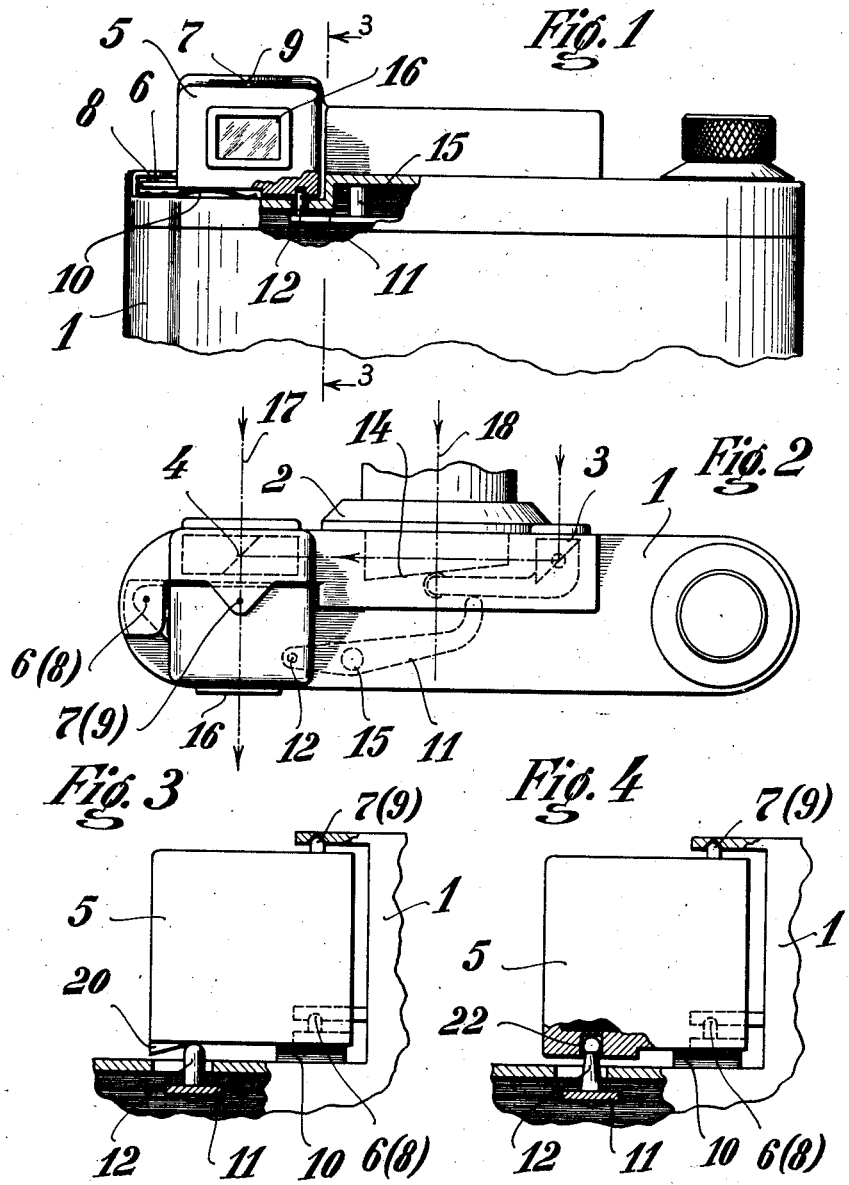
INVENTORS
*Ludwig Leitz, Wilhelm Albert.*
BY
*Ivan E. G. Konigsberg.*
ATTORNEY Patented Feb. 20, 1940

2,191,281

UNITED STATES PATENT OFFICE 2,191,281

COMBINED PHOTOGRAPHIC CAMERA AND VIEW FINDER

Ludwig Leitz and Wilhelm Albert, Wetzlar, Germany, assignors to Ernst Leitz, G. m. b. H., Wetzlar, Germany Application June 10, 1938, Serial No. 212,954
In Germany June 12, 1937

2 Claims. (Cl. 95—44)

This invention relates to view finders for photographic cameras which are arranged to be attached to and detached from the camera to correspond with exchangeable objectives of different focal lengths.

The object of this invention is to provide improved means for mounting the view finder upon the camera and at the same time automatically connect the view finder with the elements within the camera which serve to operate the view finder to compensate for parallax between the finder and the objective. In the accompanying drawing illustrating the invention Fig. 1 is a rear view of a camera and view finder embodying the invention with parts removed and parts in section.

Fig. 2 is a plan view of the camera and finder with parts broken away.

Fig. 3 is a sectional view taken on the line 3—3 of Fig. 1.

Fig. 4 is a similar view but shows a modification.

In the drawing the reference numeral 1 indicates a well known type of modern miniature hand camera having an objective 2, and a range finder diagrammatically indicated by the usual members 3—4. The inner end of the objective 14 actuates in a well known manner a lever 11 pivoted at 15. The lever carries a pin 12.

The housing of the camera is provided with two bearing seats 8 and 9 adapted to receive two bearings 6 and 7, respectively, which are suitably carried by the view finder housing 5 which contains a suitable view finder mechanism preferably constructed on the collimator principle but not illustrated in detail because the view finder as such is no part of this invention. The finder however is identified by the housing 5, the rear eye opening 16 and the finder axis 17. The objective axis is shown at 18. A spring 10 is secured to the camera and serves to yieldingly hold the view finder in its bearings 8 and 9.

In operation, when the objective is focused, the lever 11 is oscillated on its pivot 15 and the pin 12 then tilts the finder about the axis 8—9 (6—7) whereby the finder axis 17 is inclined towards the objective axis to compensate for parallax in a well known manner.

Fig. 3 shows one way in which the pin 12 may engage the finder to tilt the same. For instance the finder 5 may be provided with a cam 20 to be engaged by the pin whereby the finder is tilted. Or as in Fig. 4, the pin 12 may engage a recess 22 in the finder. When the pin swings about the pivot 15, the finder will of necessity be tilted about its axis 8—9 (6—7).

The finder is attached to the camera by inserting the finder from the rear and pressing down on the spring 10. The pivot points 6—7 will then snap into and become seated in the bearings 8—9. A slight tilting of the finder as it is being attached will enable the finder to be properly positioned with respect to and to become engaged by the pin 12.

We claim:

1. In combination, a photographic camera including an objective, a view finder, means for securing the view finder to the camera comprising bearing seats on the camera facing in the same direction, bearing points on the view finder facing in the opposite direction to engage said bearing seats to attach the view finder to the camera, a spring for maintaining said view finder points in movable seating engagement with said camera bearing seats and cooperating means on the camera and on the view finder for tilting the view finder about an axis passing through the said bearing seats and bearing points whereby to compensate for parallax between the view finder and the camera objective, said axis being perpendicular to the line connecting the optical axis of the finder and being in a plane perpendicular to the camera axis.

2. In combination, a photographic camera including an objective, a view finder, means for detachably securing the view finder to the camera comprising two bearing seats on the camera facing in the same direction, two bearing points on the view finder facing in the opposite direction and engaging said bearing seats to detachably attach the view finder to the camera, a spring on the camera for maintaining said view finder points in movable seating engagement with the said bearing seats, a lever in the camera in operative engagement with the view finder to tilt the same about an axis passing through the said bearing points whereby to compensate for parallax between the view finder and the camera objective and means within the camera for operating said lever in response to the focussing movements of the camera objective, said axis being perpendicular to the line connecting the optical axis of the finder and being in a plane perpendicular to the camera axis.

LUDWIG LEITZ.
WILHELM ALBERT.